United States Patent [19]
Becker

[11] Patent Number: 5,213,398
[45] Date of Patent: May 25, 1993

[54] ANTILOCK BRAKE ADJUSTING SYSTEM

[75] Inventor: Rolf Becker, Ditzingen, Fed. Rep. of Germany

[73] Assignee: Robert Bosch GmbH, Stuttgart, Fed. Rep. of Germany

[21] Appl. No.: 689,272

[22] PCT Filed: Nov. 16, 1989

[86] PCT No.: PCT/EP89/01381

§ 371 Date: Jun. 12, 1991

§ 102(e) Date: Jun. 12, 1991

[87] PCT Pub. No.: WO90/06870

PCT Pub. Date: Jun. 28, 1990

[30] Foreign Application Priority Data

Dec. 14, 1988 [DE] Fed. Rep. of Germany ....... 3841963

[51] Int. Cl.$^5$ .............................................. B60T 8/32
[52] U.S. Cl. .................... 303/100; 303/103; 303/105; 303/107; 188/181 A
[58] Field of Search ............... 303/91, 100, 102, 103, 303/105, 106, 107, 108, 109, 110, 111, 95; 364/426.02, 426.03, 426.01; 180/197; 188/181 A, 181 C, 181 R

[56] References Cited

U.S. PATENT DOCUMENTS

| 4,336,592 | 6/1982 | Beck | 303/105 |
| 4,672,547 | 6/1987 | Masaki et al. | 303/97 |
| 4,712,839 | 12/1987 | Brearley et al. | 303/107 X |
| 4,763,262 | 8/1988 | Leiber | 180/197 X |
| 4,852,950 | 8/1989 | Murakami | 180/197 X |

FOREIGN PATENT DOCUMENTS

| 0205277 | 12/1986 | European Pat. Off. . |
| 3546575 | 10/1987 | Fed. Rep. of Germany . |
| 2078322 | 1/1982 | United Kingdom . |
| 8806544 | 9/1988 | World Int. Prop. O. . |

Primary Examiner—Douglas C. Butler
Attorney, Agent, or Firm—Felfe & Lynch

[57] ABSTRACT

Antilock control system generates an instability criterion from at least one of slip and deceleration of the wheels and produces control signals for reducing brake pressure at the wheels when the criterion exceeds an instability threshold. The system delays the criterion reaching the threshold, for example by increasing the threshold, when vehicle deceleration increases and when downhill travel is determined. The instability criterion S may be calculated according to $S = a\dot{V} + bL + c\int L\,dt$, where $\dot{V}$ is the wheel deceleration, L is the wheel slip, and a, b, and c are constants.

12 Claims, 1 Drawing Sheet

ANTILOCK BRAKE ADJUSTING SYSTEM

BACKGROUND OF THE INVENTION

The invention relates to an anti-locking control system for preventing locking of the wheels of a vehicle during braking. WO 88/06544, to which U.S. Ser. No. 392,932 corresponds, described a system having wheel speed sensors which generate signals corresponding to the speeds of the respective wheels, an evaluation circuit which processes these signals into brake pressure control signals, and brake pressure control devices to which the control signals are fed to prevent locking. There, the vehicle deceleration is ascertained from the slope of an auxiliary reference. During a rapid drop of wheel speeds, the ascertained slope determines the progression of the reference signal needed to determine slip.

SUMMARY OF THE INVENTION

The invention aims at preventing too sensitive a control during downhill travel by using ABS control. This is achieved if the ascertained vehicle deceleration is used to vary the sensitivity of the control and to make the the control less sensitive as the vehicle deceleration increases. On high $\mu$, sensitive response of the controller is not required, and greater slip values and/or wheel deceleration can be permitted. In contrast, the control has to be very sensitive at low $\mu$. In downhill travel, part of the frictional connection of tire/roadway is used to compensate the descending force. The vehicle deceleration during downhill drive and otherwise equal conditions is therefore smaller than with the corresponding journey on a level plane. The vehicle deceleration which is reduced due to the downhill travel would make the control very sensitive, but this is not desirable, in particular when there is snow cover; large slip values are therefore of advantage.

The sensitivity can be changed by altering the slip and/or deceleration thresholds or by altering the control variables themselves. The invention can, however, also be applied where a sum is formed of various control variables and then compared with thresholds. Here, it is possible to vary individual components, for example.

DETAILED DESCRIPTION OF THE PREFERRED EMBODIMENT

Figure 1:
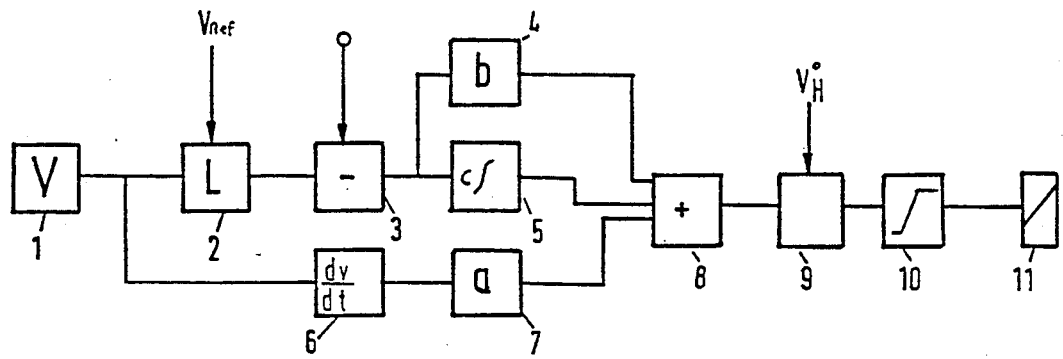
FIG. 1 shows a block diagram of a first embodiment

In FIG. 1, a wheel speed sensor is designated 1. The wheel speed signal V is fed to a slip generator 2, which will also be fed with the control variable $V_{Ref}$, which is formed, for example, in accordance with WO 88/06544. The slip value L is fed via a stage 3, on the one hand, to a multiplier 4 which forms the expression b·L, and on the other hand, to an integrator 5, which forms the expression $c \int L \, dt$.

The wheel speed V is differentiated in a differentiator 6; the expression $a \cdot \dot{V}$ is then formed in a multiplier 7.

The three above mentioned expressions are then added in an adding stage 8. Block 9 which is arranged thereafter, varies the sum $$S = L\,b + c \int L \, dt + aV$$

in accordance with the associated vehicle deceleration which here presents itself as the slope value of an auxiliary reference $V_H$. With an increasing absolute deceleration, the above sum value must be made smaller if the sensitivity is to be reduced as the deceleration increases. In a threshold stage 10, the variable sum value S is compared with a specified threshold. When the threshold is exceeded, a 3/3 solenoid is moved into its pressure reducing position.

Figure 3:
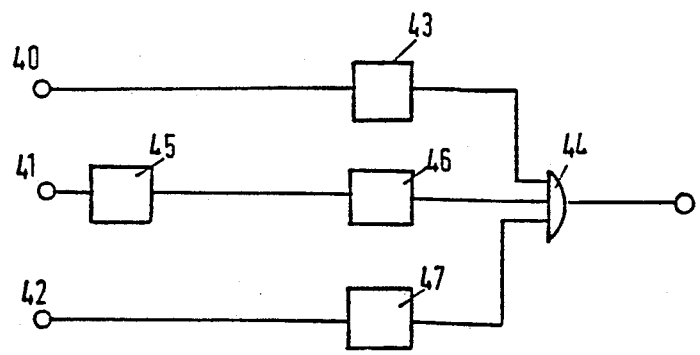
FIG. 3 shows an embodiment of an identification circuit

For example, if the identification circuit of FIG. 3 recognizes that a downhill journey takes place, it emits a signal which is fed to block 3. While block 3 usually leaves a supplied signal L uninfluenced, it now reduces the slip value L by a specified value. The two expressions formed in blocks and 5 are thus made smaller. The threshold of the threshold stage 10 is thus reached later, i.e. the controller was made insensitive.

Figure 2:
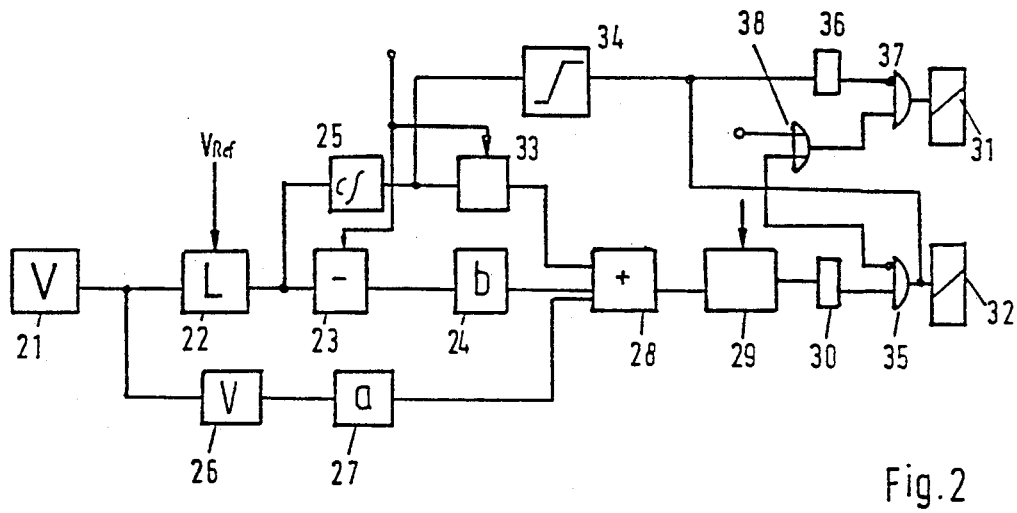
FIG. 2 shows a block diagram of a second embodiment

In the embodiment of FIG. 2, the blocks 21–30 correspond to the blocks 1–10 respectively. Here again, the sum $$S = bL + c \int L \, dt + a \cdot \dot{V}$$

is formed and varied in block 29 in relation to the vehicle deceleration. If the sum exceeds the threshold value of block 30, then inlet and outlet valve 31 and 32 are driven and pressure is reduced. In downhill travel, the expression b·L is made smaller in this case and the integral value $c \int L \, dt$ on the line to the adding unit 28 is totally suppressed by a block 33. The integral value, however, is compared with a specified integral threshold value in a threshold stage 34. If the wheel runs slowly into a high slip, then the integral value will be high and the threshold stage 34 will supply a signal. This signal inhibits, via an AND gate 35, any further driving of the outlet valve 32, but it also activates a surge generator 36, which inhibits an AND gate 37 through an output pulse for the width of the pulse and thereby prevents driving of the valve 31 via an OR gate 38. (The open terminal of the OR gate is to be connected to the other evaluation circuit, not illustrated here).

In this embodiment, the control is also set to insensitive, but a pressure pulse is additionally given to the wheel brake. This causes a wheel which slowly runs into slip to behave "normally": if it was close to the instability limit, then the pressure rise will make it run faster into slip, and control action commences faster. For adhesion coefficients requiring a high slip (e.g. snow), on the other hand, this higher slip is reached sooner, or as the case may be, simply reached.

In FIG. 3, the vehicle deceleration signal is fed to a terminal 40. If this signal is below a vehicle deceleration threshold, then a threshold stage 43 passes a signal to the AND gate 44. The pressure reducing signal is applied to a terminal 41. This signal's length is measured in block 45. If the pressure reducing times are below the reduction time threshold of a threshold stage 46, then this stage passes a signal to the AND gate 44. The wheel acceleration is fed to a terminal 42. If this is below a specified wheel acceleration threshold, then the threshold stage 47 passes a signal to the AND gate 44. If a small vehicle deceleration is found and if in addition, it is found that the pressure reducing periods are short and the wheel start is fast after pressure reduction, then the AND gate 44 generates a signal which signals "downhill travel". This signal then causes the change of control in accordance with the above examples.

It should be mentioned that the integrator and the differentiator in the circuits of FIG. 1 and 2 are always reset after a control intervention (pressure build-up or reduction). Furthermore, it should be pointed out that the invention can be equally implemented by an appropriately programmed computer.

Advantageously, the slip on the front axle is reduced more than that on the rear axle.

I claim:

1. Antilocking control system for a vehicle having front wheels and rear wheels, said system preventing locking of the wheels during braking, said system comprising wheel speed sensors which generate wheel speeds for the respective wheels, brake pressure control devices assigned to the vehicle wheels and comprising means for reducing brake pressure at said wheels during braking, means for determining at least one of slip and deceleration of the respective wheels, means for determining an instability criterion from said at least one of slip and deceleration of the respective wheels, means for determining vehicle deceleration, means for determining downhill travel of the vehicle, means for comparing said instability criterion to an instability threshold and for producing control signals for said brake pressure control devices when said instability criterion exceeds said instability threshold, means for delaying said instability criterion reaching said instability threshold when vehicle deceleration increases and when downhill travel is determined.

2. Antilocking system as in claim 1 wherein said means for determining at least one of slip and deceleration determines the slip.

3. Antilocking control system as in claim 2 further comprising means for determining a vehicle reference speed and means for determining the slope of the vehicle reference speed, said means for determining the vehicle deceleration determining the vehicle deceleration from the slope of the vehicle reference speed and the slope of the wheel speeds.

4. Antilocking control system as in claim 1 wherein said means for delaying increases said instability threshold when vehicle deceleration increases as well as when downhill travel is determined, whereby said threshold is reached later when vehicle deceleration increases as well when downhill travel is determined.

5. Antilocking control system as in claim 1 wherein said means for determining at least one of slip and deceleration determination at least the slip, said means for delaying comprising means for reducing said slip when downhill travel is determined.

6. Antilocking control system as in claim 5 further comprising means for integrating said slip, said means for determining an instability criterion on determining said criterion S according to $S = a\dot{V} + bL + c\int L dt$, in which a, b, and c are constants, $\dot{V}$ is the wheel deceleration, L is the wheel slip, and $\int L dt$ is the integral of the wheel slip, said means for delaying comprising means for reducing said slip prior integrating said slip.

7. Antilocking control system as in claim 5 wherein said means for reducing said slip reduces the slip more for the front wheels than for the rear wheels.

8. Antilocking control system as in claim 5 further comprising means for integrating said slip, said means for determining said criterion S according to $S = a\dot{V} + bL + c\int L dt$, in which a, b, and c are constants, $\dot{V}$ is the wheel deceleration, L is the wheel slip, and $\int L dt$ is the integral of said slip, said means for delaying comprising means for ignoring $c\int L dt$ when downhill travel is determined.

9. Antilocking control as in claim 8 further comprising means for comparing $c \cdot L dt$ with an integral threshold and generating a signal to generate a brake pressure pulse when said integral threshold is exceeded.

10. Antilock control system as in claim 1 wherein said means for producing control signals generates pressure reducing signals, said means for determining downhill travel comprising means for comparing said vehicle deceleration to a vehicle deceleration threshold, and means for comparing the duration of a pressure reducing signal to a reduction time threshold, said means for determining downhill travel determining downhill travel when said vehicle deceleration is below said vehicle deceleration threshold and the duration of a pressure reducing signal is less than said reduction time threshold.

11. Antilock control system as in claim 10 further comprising means for determining wheel acceleration, after a pressure reducing signal, means for comparing said wheel acceleration to a wheel acceleration threshold, said means for determining downhill travel determining downhill travel when said vehicle deceleration is below said vehicle deceleration threshold and the duration of a pressure reducing signal is less than said reduction time threshold and said wheel acceleration is below said wheel acceleration threshold.

12. Antilock control system as in claim 1 wherein said means for producing control signals generates pressure reducing signals, said means for determining downhill travel comprising means for determining wheel acceleration after a pressure reducing signal, and means for comparing said wheel acceleration to a wheel acceleration threshold, said means for determining downhill travel determining downhill travel when said wheel acceleration is below said wheel acceleration threshold.

* * * * *